United States Patent
Cantrell

[11] Patent Number: 5,966,076
[45] Date of Patent: Oct. 12, 1999

[54] FLUID LEAK DETECTOR AND SHUT-OFF DEVICE

[76] Inventor: Kevin E. Cantrell, 6700 Fox Rd., Salem, Ill. 62881

[21] Appl. No.: 09/039,105

[22] Filed: Mar. 13, 1998

[51] Int. Cl.⁶ .................................................. G08B 21/00
[52] U.S. Cl. ................. 340/605; 73/40.5 R; 137/247.15; 251/68; 251/74; 251/262
[58] Field of Search ..................................... 340/605, 603; 73/40.5 R, 40; 137/247.13, 247.15; 251/68, 74, 251, 262, 267

[56] References Cited

U.S. PATENT DOCUMENTS

| | | |
|---|---|---|
| 2,979,939 | 4/1961 | Shuh . |
| 3,261,201 | 7/1966 | Pottash . |
| 3,910,102 | 10/1975 | McLean . |
| 4,109,512 | 8/1978 | Ledeen et al. . |
| 4,305,420 | 12/1981 | Nussdorf .................................. 137/312 |
| 4,324,268 | 4/1982 | Jacobson .................................... 37/312 |
| 4,659,063 | 4/1987 | Veillette et al. ........................... 251/68 |
| 5,008,650 | 4/1991 | Hoiberg .................................... 340/604 |
| 5,126,934 | 6/1992 | MacFadyen . |
| 5,190,069 | 3/1993 | Richards . |
| 5,240,022 | 8/1993 | Franklin ....................................... 137/1 |
| 5,440,918 | 8/1995 | Oster . |
| 5,542,835 | 8/1996 | Kennedy et al. . |
| 5,586,050 | 12/1996 | Makel et al. . |

*Primary Examiner*—Jeffery A. Hofsass
*Assistant Examiner*—Julie Lieu
*Attorney, Agent, or Firm*—Tipton L. Randall

[57] ABSTRACT

The invention is a shut-off device for a gas or liquid conduit that closes the conduit upon receiving a signal from a leak detector. The shut off device is a spring biased full flow ball valve positioned in the fluid conduit that closes upon receiving a signal from the leak detector that a fluid leak has occurred. The detector may be a conductivity detector for liquids or a specific gas detector, and may be hard wired or remote signaling in operation. Multiple detectors may be used in the system. An audible alarm is also activated when a leak is detected.

14 Claims, 6 Drawing Sheets

Top View

Bottom View

FLUID LEAK DETECTOR AND SHUT-OFF DEVICE

FIELD OF THE INVENTION

The invention relates to a device to shut off fluid flow in a conduit, and more particularly, to a device to shut off fluid flow in a conduit upon sensing a leak or otherwise dangerous condition associated with the fluid.

BACKGROUND OF THE INVENTION

There are many fluids that are routed from one location to another by means of a conduit. The fluids include both gases and liquids. In residential dwellings, office buildings, and manufacturing facilities the most common fluids transferred by conduit or pipe include natural or LP gas for heating or cooling, water, and liquid petroleum products, an example being fuel oil.

Safety is of major concern in using the above mentioned fluids in our homes or places of business for the modern conveniences of heating, cooling, or cooking. Serious safety hazards arise when a fluid leak in the conduit system occurs, or a piece of equipment that uses one or more of the fluids malfunctions. These leaks or malfunctions can result in accumulation of explosive concentrations of fuel gases within a structure, or toxic concentrations of carbon monoxide generated from malfunction of a gas powered appliance such as a furnace, water heater, gas dryer, or the like. Similarly, property damage occurs every day due to water leaking from a water heater, broken water line, or even a bathtub overflowing. Likewise, liquid petroleum fuel is used for heating both buildings and water. Leakage of the liquid from the fuel conduit carrying the fuel, or from the device that burns the fuel, presents a hazardous situation to individuals in the vicinity.

Currently, a variety of devices are commercially available to detect gaseous hazards such as natural gas, carbon monoxide, smoke, etc. These devices usually emit an audible alarm to warn building occupants of the danger, but do nothing to remedy the situation that caused the danger.

A number of innovations have been developed relating to devices for detecting fluid leaks and shutting off fluid flow. The following U.S. patents are representative of some of those innovations.

Shuh, in U.S. Pat. No. 2,979,939, Pottash, in U.S. Pat. No. 3,261,201, and McLean in U.S. Pat. No. 3,910,102 all describe a gasoline leak detector based on pressure changes.

A line break detection system for pipelines based on pressure drop is disclosed by Ledeen et al. in U.S. Pat. No. 4,109,512.

A leak testing apparatus that measures liquid level drop is described by Oster in U.S. Pat. No. 5,440,918.

In U.S. Pat. No. 5,542,835, Kennedy et al. describe a leak detector for plastic injection molding machines that shuts down the fluid plastic injection when air flow through a conduit is blocked by plastic material.

Makel et al., in U.S. Pat. No. 5,586,050, disclose a computerized liquid natural gas management system that includes a leak detection system with emergency warning and shut-down capabilities.

Richards, in U.S. Pat. No. 5,190,069, discloses a leak detector, based on a conductivity detector, for use in water supply systems. The device uses a solenoid to close a supply conduit valve when the conductivity detector senses a leak.

MacFadyen, in U.S. Pat. No. 5,126,934, discloses a gas distribution system that includes a leak detector connected to a shut-off valve.

Most of the above described inventions for shutting off fluid flow use a solenoid valve within the fluid conduit line as the means of stopping fluid flow. The standard solenoid valve uses the solenoid to raise or lower a plunger with attached diaphragm seal to open or close -the main port of the valve body. The solenoid valve is not a full flow type valve and presents considerable flow restriction to the fluid in the valved conduit. When used with liquids, such as water, a strainer assembly is often necessary to protect the internal diaphragm from fouling due to sediment or other foreign material in the water conduit. In addition, many state plumbing codes require that line valves controlling water supply lines within buildings must be full-port shut-off valves, or have a cross-sectional area at least as large as the smallest pipe in which the valve is installed.

Thus, there is an unmet need for a device that automatically shuts off a fluid supply line to a building or piece of equipment for safety, and to prevent property damage, upon sensing a fluid leak or otherwise dangerous condition associated with use of the fluid.

SUMMARY OF THE INVENTION

The invention is an apparatus for interrupting flow of fluid in a fluid-carrying conduit upon detection of a dangerous or damaging condition associated with the fluid. The apparatus comprises a full flow valve member positioned in the fluid-carrying conduit, the valve member having external mechanical operating means for orientating the valve member between a full open orientation and a full closed orientation. A biasing means is secured to the valve member external mechanical orienting means with the means biasing the valve member toward a full closed orientation. A releasable latch assembly means secured to the valve member external mechanical orienting means latches the valve member in a full open orientation. A detector means, in communication through communication means with the releasable latch assembly means, upon sensing a dangerous condition associated with the fluid, signals the releasable latch assembly through the communication means. The signal causes the release of the valve member external mechanical orienting means attached thereto, allowing the biasing means attached to the orienting means to move the valve member to a closed orientation, thereby interrupting fluid flow in the fluid carrying conduit.

DESCRIPTION OF THE PREFERRED EMBODIMENTS

Definitions

As utilized herein, including the claims, the term "fluid" references a flowable non-solid substance, including gases and liquids.

Nomenclature
10 Main Control Box Member
12 Control Box Removable Cover
14 Alarm and Remote Receiving Device
16 Fluid Carrying Conduit
18 Control Box Inlet Conduit
20 Control Box Outlet Conduit
22 Manual Reset Lever
24 Control Box Lever Aperture
26 Full Flow Valve Member
28 External Handle for Valve Member
30 Biasing Spring Member
32 External Valve Handle End
34 Latch Assembly Means
36 Detector Means
38 Short Leg of Reset Lever
40 Long Leg of Reset Lever
42 Magnetic Latch Member
44 Solenoid Actuator for Magnetic Latch
45 Control Box Magnetic Latch Aperture
46 Power Disconnect Switch
50 Conductivity Liquid Sensors
52 System Test Button
54 Power Source
56 Circuitry Test Button
58 Indicator Light
60 Micro Relay Member Construction The apparatus of the present invention includes a means for interrupting fluid flow in a fluid carrying conduit upon detection of a dangerous condition, such as a fluid leak, associated with the fluid. The invention is described with reference to liquid water, but is not limited to water only. The invention is applicable to all fluids carried in a conduit.

Figure 1:
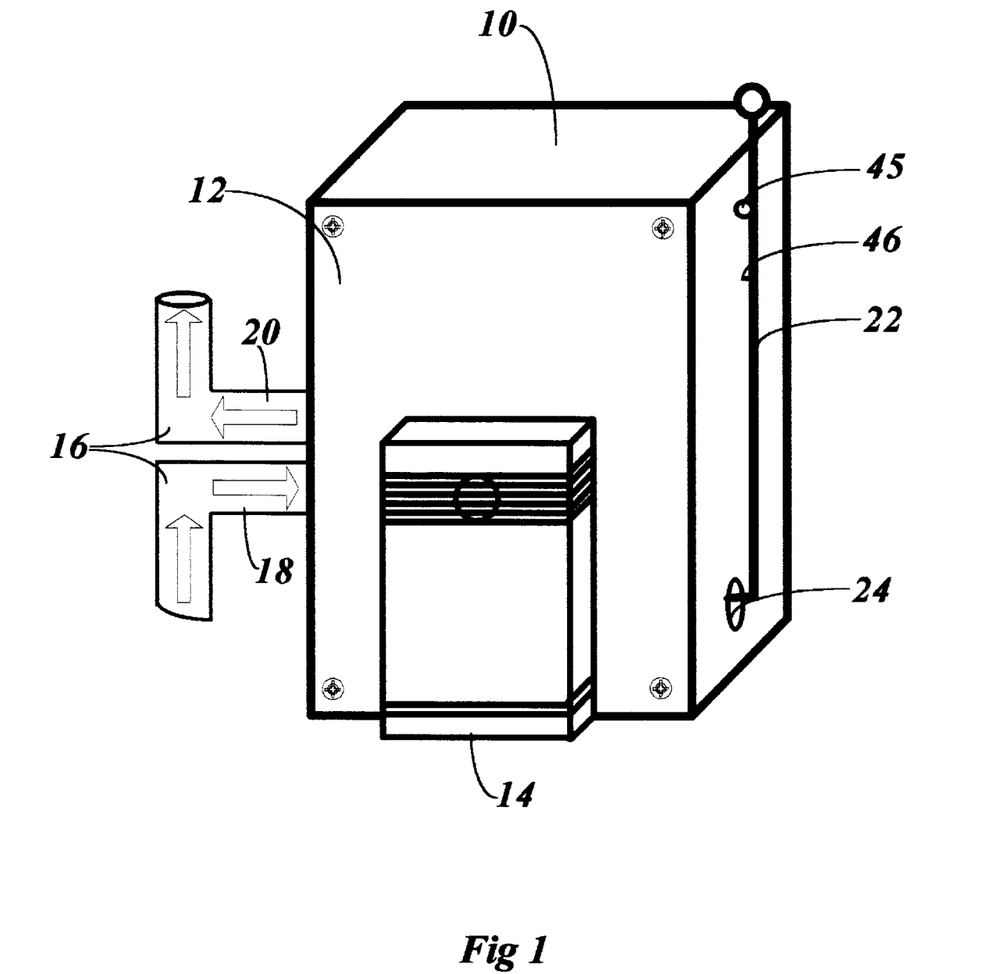
FIG. 1 is a perspective elevational view of the main control box of the present invention with the manual reset lever in the ready position.

Referring to FIG. 1, the main control box member 10 of the present invention is shown. The control box 10 has a removable cover 12 with an audible alarm and remote receiver device 14 that is described in detail later. A fluid carrying conduit 16 routes a fluid to the control box fluid inlet 18, and the control box fluid outlet 20 carries the fluid away. The main control box member 10 is positioned within a dwelling, and the total fluid supply, either liquid or gas, that enters the dwelling through the conduit 16 passes through the main control box member 10. A manual reset lever 22 extends exterior the control box member 10 via an aperture 24 therein.

Figure 2:
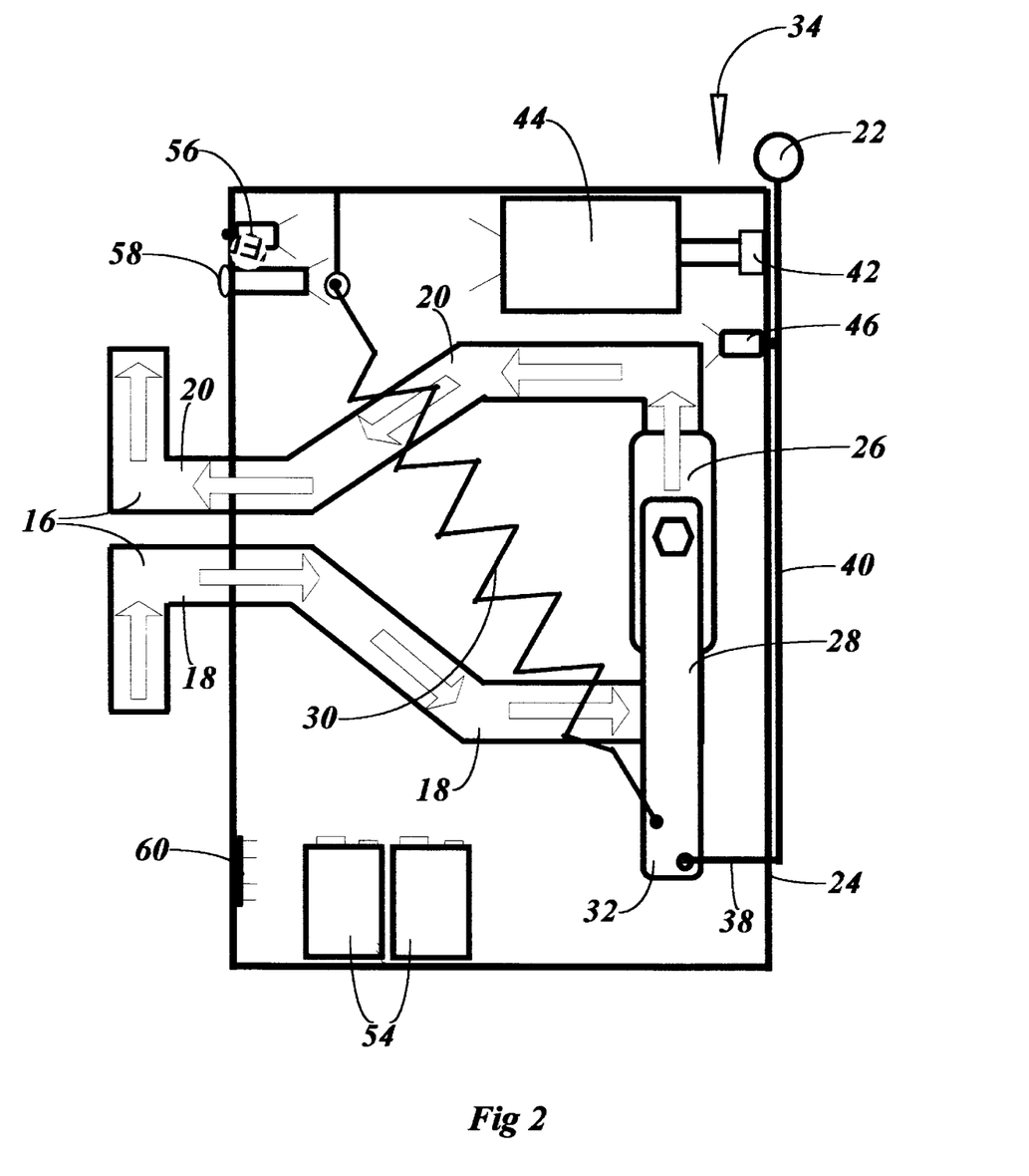
FIG. 2 is a plan view of the main control box in the ready position with the cover removed.
Figure 3:
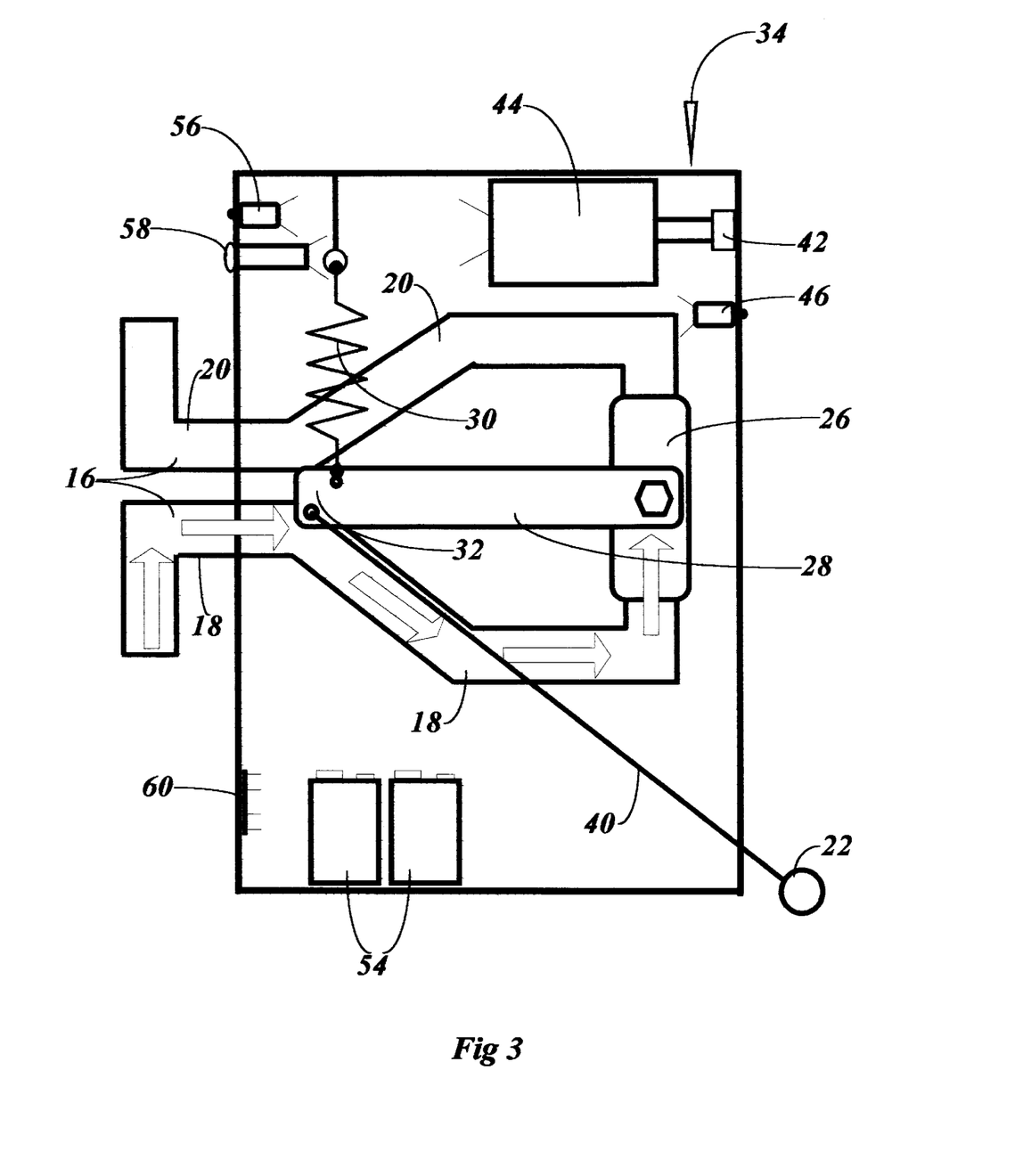
FIG. 3 is a plan view of the main control box in the tripped position with the cover removed.

The interior of the main control box member 10 is shown in FIGS. 2 and 3. The control box inlet 18 and outlet 20 conduits are connected to the ports of a full flow valve member 26, such that all fluid in the conduit 16 passes through the valve member 26. The valve member 26 has an external valve handle 28 that mechanically operates the valve member 26 between a full open orientation (FIG. 2) and a full closed orientation (FIG. 3).

The valve member handle 28 has a biasing means, in the form of a spring member 30, that urges the valve handle 28 toward a full closed orientation. The spring member 30 is fastened at one end to the end 32 of the valve handle 28 furthest from the valve member 26. The opposite end of the spring member is secured to a distant point on the interior of the control box member 10 such that the spring member 30 urges the valve handle 28 toward a full closed orientation.

In order to maintain the valve member 26 in a fill open orientation, a releasable latch assembly means 34 is also secured to the end 32 of the valve external handle 28 furthest from the valve member 26. The releasable latch assembly 34 maintains the biasing spring member 30 in a stretched condition as seen in FIG. 2. A detector means 36 is in communication, via communication means, with the releasable latch assembly means 34. Upon sensing a dangerous condition associated with the fluid, such as a leak of liquid or gas, the detector means 36 signals the releasable latch assembly means 34 through the communication means. The latch means 34 release the valve external handle 28, and the biasing spring member 30 actuates the valve member 26 from a full open to a full closed orientation. The closing of the valve member 26 interrupts the flow of fluid through the fluid carrying conduit 16, thereby minimizing the consequences of the dangerous condition sensed by the detector means.

The latch assembly means 34 includes a manual reset lever 22 attached to the end 32 of the valve external handle 28 furthest from the valve member 26. The manual reset lever 22 extends from inside the main control box member 10, through the lever aperture 24, and terminates exterior the box member 10. The manual reset lever 22 is L-shaped with a shorter leg 38 connected to the valve handle end 32, and a longer leg 40 exterior the box member 10. The manual reset lever 22, made of a ferromagnetic material, is held in position essentially against the exterior of the box member 10 by means of a magnetic latch member 42 that is controlled by a solenoid actuator 44 The solenoid actuator 44 is positioned inside the control box member 10, with the attached magnetic latch member 42 positioned within a latch aperture 45 in the side of the control box member 10. The magnetic latch member 42 is positioned approximately flush with the side surface of the control box member 10, and holds the ferromagnetic manual reset lever 22 by magnetic attraction. The long leg portion 40 of the manual reset lever 22 exterior the control box member 10 is of sufficient length that it provides a mechanical advantage sufficient to hold the valve handle member 32 in an open orientation against the biasing of the spring member 30. The manual reset lever 22 also is held against a power disconnect switch 46 that is fastened inside the control box member 10, and extends through the side of the control box member 10 near the magnetic latch member 42. The L-shaped manual reset lever 22, upon being released by the magnetic latch member 42, is pulled through the lever aperture 24 in the box member 10 by the motion of the biasing spring member 30 moving the valve member handle 28 to close the valve member 26.

Figure 4:
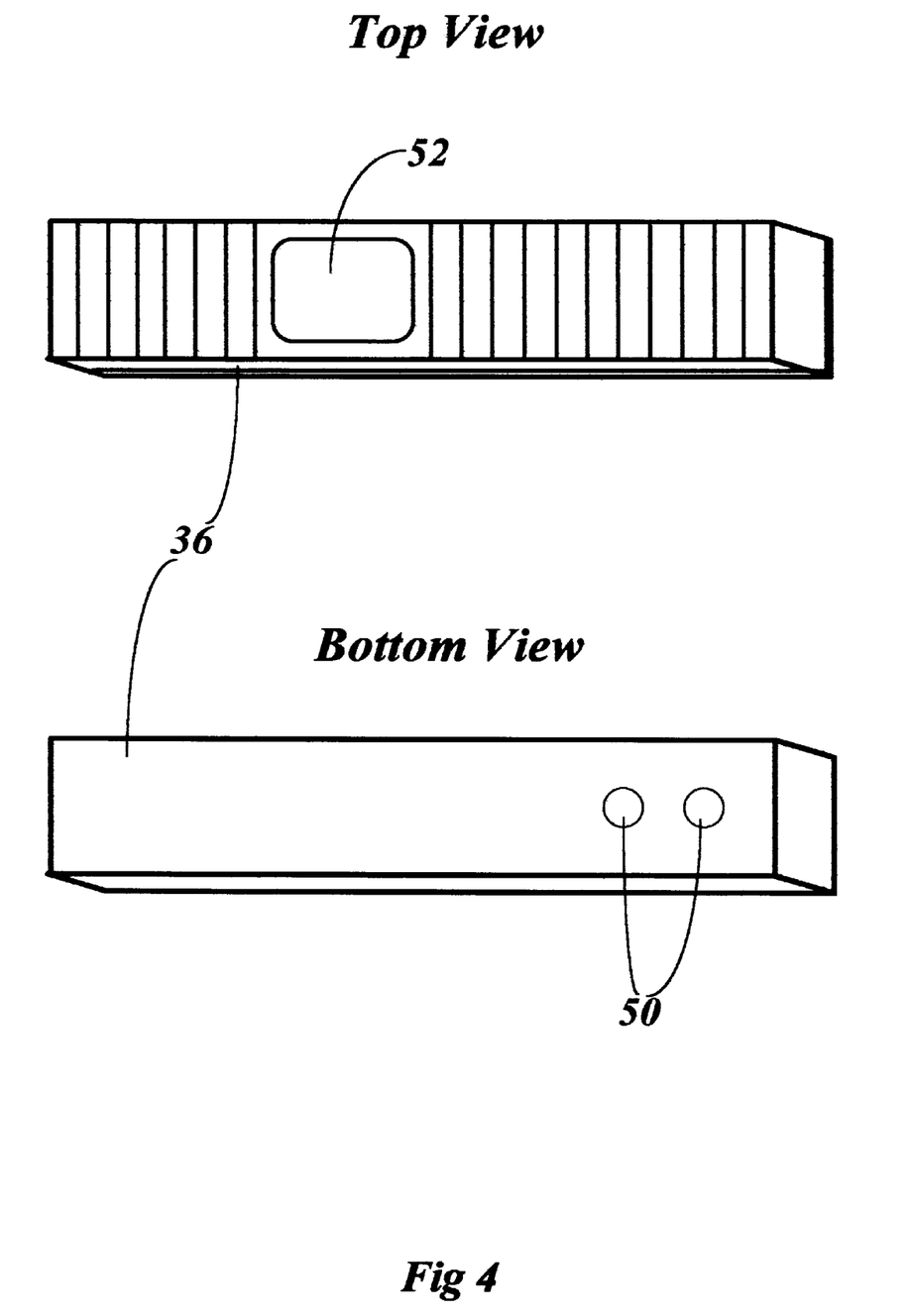
FIG. 4 is a top and a bottom view of the conductivity detector.

The detector means 36, in this case a conductivity detector, is depicted in FIG. 4. The detector is designed to detect liquid, such as water, that provide conductivity between the conductivity liquid sensors 50 of the detector. The detector means 36 is placed at a location in a dwelling where a water leak may occur, such as the basement, laundry room, bathroom, etc. with the liquid sensors 50 close to a low point where water would collect. Multiple detector means 36 may be used to monitor separate locations. The detector means 36 is preferably battery powered and contains a transmitter, such as a radio frequency transmitter, to communicate detection of a water leak to the receiver 14 located at the main control box member 10. The detector means 36 also has a system test button 52 to ensure that battery power is operational and the transmitter functions properly. In certain situations, the detector means 36 may be hard wired directly to the control box member 10, with no battery power being required by the detector means 36. The system test button 52 remains present in order to test the shut-off system. Other detector means 36 capable of transmitting a leak or otherwise dangerous condition associated with the fluid in the fluid carrying conduit 16 are contemplated for use in the present invention. The detector means 36 can be a smoke detector, a hydrocarbon gas detector or a carbon monoxide detector. These gas specific detectors are also capable of transmitting a shut-off signal to the receiver 14 located at the main control box member 10 that controls the valve member 26, thus interrupting the flow of fuel to a furnace, water heater, dryer or other appliance.

The alarm and remote receiver device 14, mounted on the exterior of the main control box member 10, receives the signal from the detector means 36, when a leak or otherwise dangerous condition is detected. The device 14 contains a suitable receiver, such as a radio frequency receiver, for signal reception. The device 14 also sounds an audible alarm to warn dwelling occupants, and sends an electrical signal to the solenoid actuator member 44 connected to the magnetic latch member 42. The signal causes the solenoid actuator 44 to move the magnetic latch member 42 away from the magnetic latch aperture 45 and manual reset lever 22, thereby freeing the lever 22 and allowing the biasing spring member 30 to close the valve member 26, thus interrupting the flow of fluid through the fluid carrying conduit 18.

Figure 5:
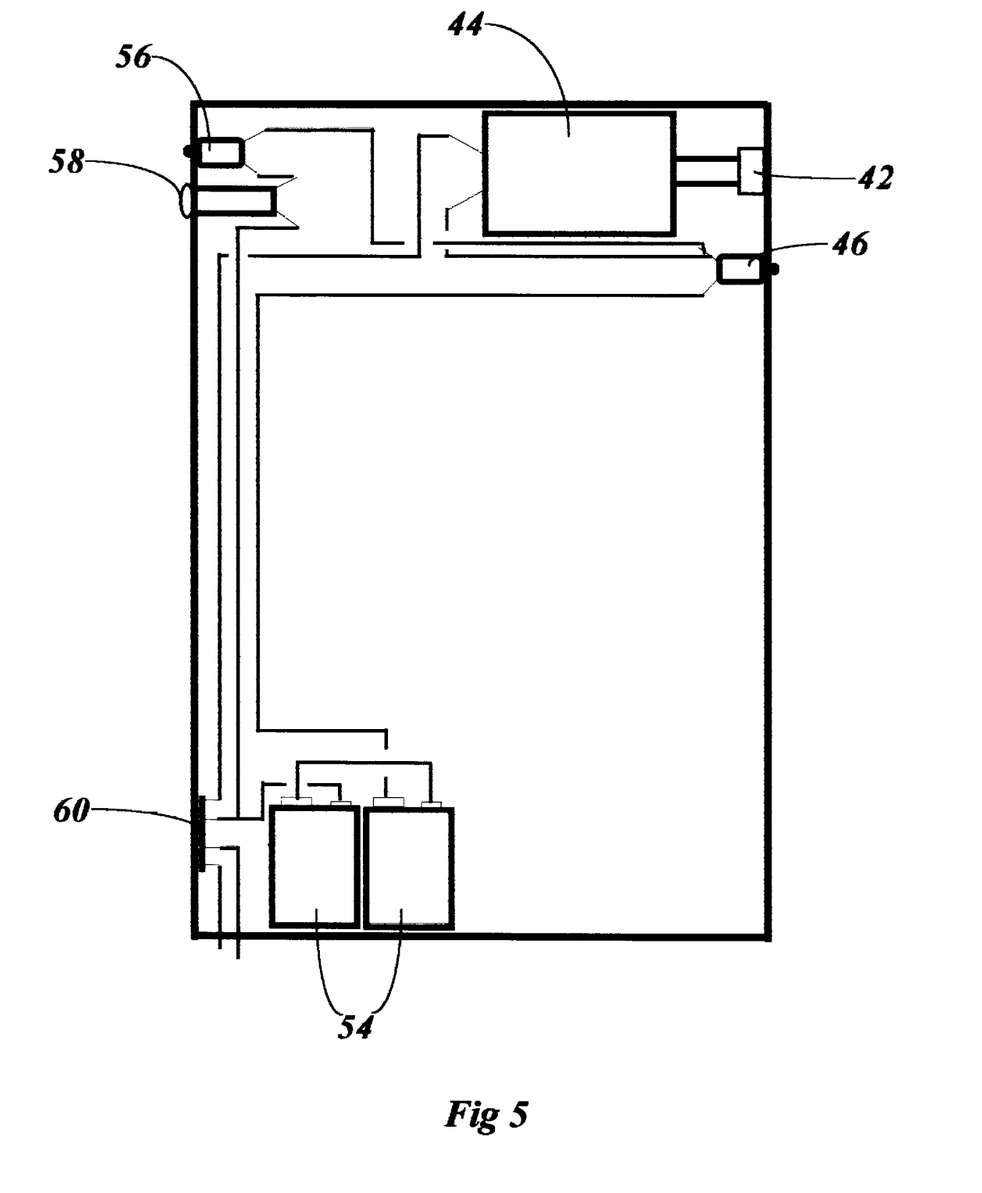
FIG. 5 is a schematic diagram of the electrical circuitry within the main control box.

Although the alarm and remote receiver device 14 may be powered by a standard 110 volt circuit source, it is preferred that a self-contained power source 54, such as one or more 9-volt batteries be employed. Thus, the leak detector means 36 and the main control box member system 10 are not subject to power interruption and malfunction when both are powered by batteries. The main control box member 10 electrical circuitry is shown in FIG. 5. A circuitry test button 56 and a test indicator light 58 are included in the circuit to allow for testing of the components.

The precise sequence of events that occurs upon the detector means 36 sensing a dangerous condition and sending a signal to the receiver/alarm device 14 is as follows.

1. The alarm device 14 sounds an audible alarm that continues until the alarm condition is rectified.
2. A voltage is sent to the micro relay 60 within the control box circuitry 10.
3. The micro relay 60 closes, which in turn closes the circuit between the power-disconnect switch 46, solenoid actuator 44, and batteries 54 or other power supply.
4. The solenoid actuator 44 is energized, pulling the magnetic latch member 42 away from the manual reset lever 22.
5. The biasing spring 30 pulls the valve member handle 28 to the full closed position, which in turn pulls the manual reset lever 22 partially into the lever aperture 24, which is the tripped position.
6. The power-disconnect switch 46 then breaks the circuit to the solenoid actuator 44 which brings the magnetic latch member 42 back into position to latch the manual reset lever 22 when the assembly is reset.

Figure 6:
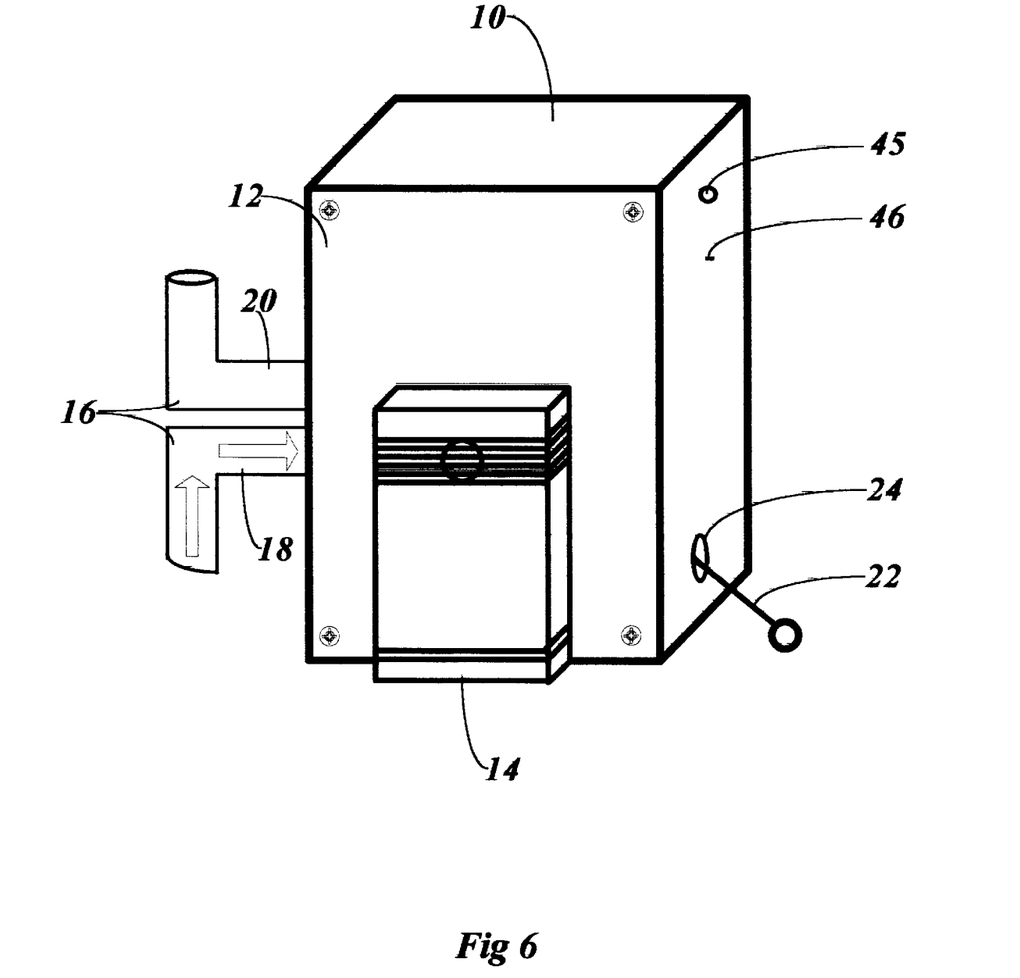
FIG. 6 is perspective elevational view of the main control box of the present invention with the manual reset lever in the tripped position.

The main control box member 10 in a tripped condition is shown in FIG. 6, with the end of the reset lever 22 protruding from the lever aperture 24 therein. In operation, once the leak detection system has activated the biasing spring member 30 to close the valve member 26, the fluid flow through the valve member 26 may be restored only by manually opening the valve member 26 by pulling on the manual reset lever 22 and securing the lever 22 to the magnetic latch member 42 with the lever 22 also engaging the power disconnect switch 46. Once the manual release lever 22 is in position, the circuitry test button 56 on the side of the control box 10 is pressed in order to verify that the indicator light 58 comes on. The lighting of the indicator light 58 shows that the power disconnect switch 46 is fully engaged, and that the power source 54 is available to operate the shut-off device.

The presently described invention provides the advantage that closing the valve member 26 relies on the mechanical action of a biasing spring member 30, not on an electrically operated valve contained in the fluid conduit. The attachment fittings and full flow valve member 26 employed to control fluid flow in the conduit 16 conform to all codes and specifications for the particular fluid controlled. For instance, the valve member 26 for natural gas service conforms to American Gas Association (AGA) standards with the fittings being threaded iron pipe. The self-contained power features of the invention overcome the problem of power interruption to the system, as well.

While the invention has been particularly shown and described with reference to a preferred embodiment thereof it will be understood by those skilled in the art that various changes in form and details may be made therein without departing from the spirit and scope of the invention.

I claim:

1. An apparatus for interrupting flow of fluid in a fluid-carrying conduit upon detection of a dangerous condition associated with said fluid, comprising;
    a) a full flow valve member positioned in said fluid-carrying conduit, said valve member having external mechanical operating means for orientating said valve member between a full open orientation and a full closed orientation;
    b) biasing means secured to said valve member external mechanical operating means, said means biasing said valve member toward a full closed orientation;
    c) releasable latch assembly means secured to said valve member external mechanical operating means, said assembly latching said valve member in a full open orientation, said releasable latch assembly means comprising a manual release lever member fastened to said valve member external mechanical operating means, said manual release lever member latching said valve member in a full open orientation, said manual release lever member magnetically connected to a magnetic latch means secured to a solenoid actuator, said solenoid actuator responding to a signal from a detector means to disconnect said magnetic latch means from said manual release lever member, thereby allowing said valve member to move to a full closed orientation; and
    d) detector means in communication through communication means with said releasable latch assembly means, said detector means, upon sensing a dangerous condition associated with said fluid, signaling said releasable latch assembly through said communication means, thereby releasing said valve member external mechanical operating means attached thereto, allowing said biasing means attached to said operating means to move said valve member to a closed orientation, thereby interrupting fluid flow in said fluid carrying conduit.

2. An apparatus according to claim 1 wherein said external mechanical operating means for said valve member is a valve member handle.

3. An apparatus according to claim 2 wherein said biasing means secured to said operating means is a spring member secured to said valve member handle at an end furthest from said valve member.

4. An apparatus according to claim 1 wherein said biasing means secured to said operating means is a spring member.

5. An apparatus according to claim 1 wherein said detector means is selected from the group consisting of conductivity detector, gas specific detector and hydrocarbon liquid detector.

6. An apparatus according to claim 1 wherein said communication means comprises;
   a) a remote transmitter means attached to said detector means for transmitting an alarm signal;
   b) a remote receiver means for receiving said alarm signal; and
   c) circuit means connecting said remote receiver means to said releasable latch assembly means for relaying said alarm signal thereto.

7. An apparatus according to claim 1 wherein said communication means comprises a hard wired circuit between said detector means and said releasable latch assembly means.

8. An apparatus according to claim 1 wherein said detector means, communication means and releasable latch assembly means are operated by self-contained power units.

9. An apparatus for interrupting flow of fluid in a fluid-carrying conduit upon detection of a dangerous condition associated with said fluid, comprising;
   a) a full flow valve member positioned in said fluid-carrying conduit, said valve member having external mechanical operating means for orientating said valve member between a full open orientation and a full closed orientation;
   b) biasing means secured to said valve member external mechanical operating means, said means biasing said valve member toward a full closed orientation, said full flow valve member with external mechanical operating means and said biasing means attached thereto enclosed within a control box member;
   c) releasable latch assembly means secured to said valve member external mechanical operating means, said releasable latch assembly means comprising a manual release lever member fastened to said valve member external mechanical operating means, said manual release lever member latching said valve member in a full open orientation, said manual release lever member extending from interior said control box member through an aperture therein, exterior said control box member said manual release lever member magnetically connected to a magnetic latch means secured to a solenoid actuator, said solenoid actuator responding to a signal from a detector means to disconnect said magnetic latch means from said manual release lever member, thereby allowing said valve member to move to a full closed orientation; and
   d) detector means in communication through communication means with said releasable latch assembly means, said detector means, upon sensing a dangerous condition associated with said fluid, signaling said releasable latch assembly through said communication means, thereby releasing said valve member external mechanical operating means attached thereto, allowing said biasing means attached to said operating means to move said valve member to a closed orientation, thereby interrupting fluid flow in said fluid carrying conduit.

10. An apparatus according to claim 9 wherein said biasing means secured to said orienting means is a spring member secured to said valve member handle at an end furthest from said valve member.

11. An apparatus according to claim 9 wherein said detector means is selected from the group consisting of conductivity detector, gas specific detector and hydrocarbon liquid detector.

12. An apparatus according to claim 9 wherein said communication means comprises;
   a) a remote transmitter means attached to said detector means for transmitting an alarm signal;
   b) a remote receiver means for receiving said alarm signal; and
   c) circuit means connecting said remote receiver means to said releasable latch assembly means for relaying said alarm signal thereto.

13. An apparatus according to claim 9 wherein said communication means comprises a hard wired circuit between said detector means and said releasable latch assembly means.

14. An apparatus according to claim 9 wherein said detector means, communication means and releasable latch assembly means are operated by self-contained power units.

* * * * *